(12) United States Patent
Wu et al.

(10) Patent No.: US 9,501,135 B2
(45) Date of Patent: *Nov. 22, 2016

(54) DYNAMIC CORE SELECTION FOR HETEROGENEOUS MULTI-CORE SYSTEMS

(71) Applicant: INTEL CORPORATION, Santa Clara, CA (US)

(72) Inventors: Youfeng Wu, Palo Alto, CA (US); Shiliang Hu, Los Altos, CA (US); Edson Borin, San Jose, CA (US); Cheng Wang, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/169,955

(22) Filed: Jan. 31, 2014

(65) Prior Publication Data

US 2014/0223166 A1    Aug. 7, 2014

Related U.S. Application Data

(63) Continuation of application No. 13/046,031, filed on Mar. 11, 2011, now Pat. No. 8,683,243.

(51) Int. Cl.
*G06F 1/32* (2006.01)
*G06F 9/38* (2006.01)
(Continued)

(52) U.S. Cl.
CPC ............ *G06F 1/329* (2013.01); *G06F 1/3287* (2013.01); *G06F 9/3851* (2013.01); *G06F 9/445* (2013.01);
(Continued)

(58) Field of Classification Search
CPC ... G06F 1/3203; G06F 1/3206; G06F 1/3293
See application file for complete search history.

(56) References Cited

U.S. PATENT DOCUMENTS 7,100,060 B2   8/2006 Cai et al.
8,683,243 B2   3/2014 Wu et al.
(Continued)

FOREIGN PATENT DOCUMENTS

JP    2004-171234    6/2004
JP    2008-513912    5/2008
(Continued)

OTHER PUBLICATIONS

Korean Notice of Preliminary Rejection and English translation for Application No. 10-2013-7025102, dated Nov. 27, 2014, 12 pages.
(Continued)

*Primary Examiner* — Kim Huynh
*Assistant Examiner* — Eric Chang
(74) *Attorney, Agent, or Firm* — Barnes & Thornburg LLP

(57) ABSTRACT

Dynamically switching cores on a heterogeneous multi-core processing system may be performed by executing program code on a first processing core. Power up of a second processing core may be signaled. A first performance metric of the first processing core executing the program code may be collected. When the first performance metric is better than a previously determined core performance metric, power down of the second processing core may be signaled and execution of the program code may be continued on the first processing core. When the first performance metric is not better than the previously determined core performance metric, execution of the program code may be switched from the first processing core to the second processing core.

20 Claims, 6 Drawing Sheets

(51) Int. Cl.
G06F 9/50 (2006.01)
G06F 9/445 (2006.01)
G06F 9/48 (2006.01)
G06F 11/34 (2006.01)

(52) U.S. Cl.
CPC .......... G06F 9/4893 (2013.01); G06F 9/5027 (2013.01); G06F 9/5094 (2013.01); G06F 11/3466 (2013.01); *G06F 11/3409* (2013.01); *G06F 11/3452* (2013.01); *G06F 2201/81* (2013.01); *G06F 2201/865* (2013.01); *G06F 2201/88* (2013.01); *G06F 2209/501* (2013.01); *Y02B 60/1282* (2013.01); *Y02B 60/142* (2013.01); *Y02B 60/165* (2013.01); *Y02B 60/32* (2013.01)

(56) References Cited

U.S. PATENT DOCUMENTS

| | | |
|---|---|---|
| 2004/0098718 A1 | 5/2004 | Yoshii et al. |
| 2004/0215987 A1 | 10/2004 | Farkas et al. |
| 2005/0013705 A1 | 1/2005 | Farkas et al. |
| 2008/0209243 A1 | 8/2008 | Ghiasi et al. |
| 2008/0263324 A1 | 10/2008 | Sutardja et al. |
| 2009/0125293 A1* | 5/2009 | Lefurgy et al. ............ 703/18 |
| 2011/0004884 A1 | 1/2011 | Merchant et al. |
| 2012/0233477 A1 | 9/2012 | Wu et al. |

FOREIGN PATENT DOCUMENTS

| | | |
|---|---|---|
| JP | 2010-538371 | 12/2010 |
| JP | 5750172 B2 | 7/2015 |
| TW | 200837547 A | 9/2008 |
| TW | 200933385 A | 8/2009 |
| WO | WO2006037119 A2 | 4/2006 |
| WO | WO2009029643 A2 | 3/2009 |

OTHER PUBLICATIONS

International Search Report for International Application No. 11860992.4-1959 / 2684127 PCT/US2011067630, Oct. 24, 2014, 7 pages.
Allarey et al., "Power Management Enhancements in the 45nm Intel Core TM Microarchitecture" Intel Technology Journal, vol. 12, Issue 3, Oct. 2008, pp. 169-178.
Azizi et al., "Energy-Performance Tradeoffs in Processor Architecture and Circuit Design: A Marginal Cost Analysis", Proceedings of the 37th annual international symposium on Computer architecture, vol. 38, Issue 3, Jun. 19-23, 2010, pp. 26-36.
Borin et al., "TAO: Two-Level Atomicity for Dynamic Binary Optimizations", Intel Corporation, CGO 2010, Apr. 24-28, 2010, pp. 12-21.
Chakraborty et al., "Computation Spreading: Employing Hardware Migration to Specialize CMP Cores On-the-fly", Proceedings of the 12th international conference on Architectural support for programming languages and operating systems, Oct. 21-25, 2006, pp. 283-292.
Dally et al., "Efficient Embedded Computing" IEEE Computer Society, Jul. 2008, pp. 27-32.
Dandumont, "Power Management: Tests and Theory", Jun. 5, 2008, 4 pages, available at: <http://www.tomshardware.com/reviews/intel-atom-cpu,1947-7.html>.
Dehnert et al., "The Transmeta Code Morphing Software: Using Speculation, Recovery, and Adaptive Retranslation to Address Real-Life Challenges", IEEE Computer Society, Proceedings of the International Symposium on Code Generation and Optimization, 2003, 10 pages.
Dhodapkar et al., "Comparing Program Phase Detection Techniques", IEEE Computer Society, Proceedings of the 36th International Symposium on Microarchitecture, 2003, IEEE, 11 pages.

Ebcioglu et al., "DAISY: Dynamic Compilation for 100% Architectural Compatibility", ISCA 1997, pp. 26-37.
Ekman et al., "Performance And Power Impact Of Issue-Width in Chip-Multiprocessor Cores", IEEE Computer Society, Proceedings of the 2003 International Conference on Parallel Processing, 2003 IEEE, 10 pages.
Fan et al., "Bridging the Computation Gap Between Programmable Processors and Hardwired Accelerators", IEEE 15th International Symposium on High Performance Computer Architecture, 2008, pp. 313-322.
Grochowski et al., "Energy per Instruction Trends in Intel Microprocessors", Technology@ Intel Magazine, Mar. 2006, 4 pages.
Gummaraju et al., "Stream Programming on General-Purpose Processors", IEEE Computer Society, Proceedings of the 38th Annual IEEE/ACM International Symposium on Microarchitecture, 2005, 12 pages.
Homayoun et al., "Improving Performance and Reducing Energy-Delay With Adaptive Resource Resizing for Out-of-Order Embedded Processors", Proceedings of the 2008 ACM SIGPLAN-SIGBED conference on Languages, compilers, and tools for embedded systems, vol. 43, Issue 7, Jul. 2008, available at: <http://portal.acm.org/citation.cfm?id=1375668>.
Hsu et al., "A 2GHz 13.6mW 12x9b Multiplier for Energy Efficient FFT Accelerators", IEEE, Proceedings of the 31st European Solid-State Circuits Conference, Paper 4.E.2, 2005, pp. 199-202.
Hu et al., "Reducing Startup Time in Co-Designed Virtual Machines", IEEE Computer Society, Proceedings of the 33rd International Symposium on Computer Architecture, vol. 34, Issue 2, May 2006, 12 pages.
International Search Report and Written Opinion received for PCT Patent Application No. PCT/US2011/067630, mailed on Aug. 31, 2012, 12 pages.
Kamruzzaman et al., "Software Data Spreading: Leveraging Distributed Caches to Improve Single Thread Performance", Proceedings of the 2010 ACM SIGPLAN conference on Programming language design and implementation, vol. 45, Issue 6, Jun. 5-10, 2010, pp. 460-470.
Kelm et al., "Rigel: An Architecture and Scalable Programming Interface for a 1000-core Accelerator", Proceedings of the 36th annual international symposium on Computer architecture, vol. 37, Issue 3, Jun. 20-24, 2009, pp. 140-151.
Kim et al., "Hardware Support for Control Transfers in Code Caches", IEEE Computer Society, Proceedings of the 36th International Symposium on Microarchitecture, 2003, Dec. 3-5, 2003, 12 pages.
Kindratenko et al., "GPU Clusters for High-Performance Computing", IEEE Cluster, Aug. 31 to Sep. 4, 2009, 8 pages.
Kumar et al., "Conjoined-Core Chip Multiprocessing", IEEE Computer Society, Proceedings of the 37th International Symposium on Microarchitecture, 2004, 12 pages.
Kumar et al., "Single-ISA Heterogeneous Multi-Core Architectures: The Potential for Processor Power Reduction", In Proceedings of the 36th International Symposium on Microarchitecture, Dec. 2003, pp. 81-92.
Kumar et al., "Core Architecture Optimization for Heterogeneous Chip Multiprocessors", Proceedings of the 15th international conference on Parallel architectures and compilation techniques, Sep. 16-20, 2006, pp. 23-32.
Lu et al., "Design and Implementation of a Lightweight Dynamic Optimization System", Journal of Instruction-Level Parallelism 6, Apr. 4, 2004, pp. 1-24.
McNairy et al., "Itanium 2 Processor Microarchitecture", IEEE Micro, IEEE Computer Society, vol. 23 Issue 2, Mar. 2003, pp. 44-55.
Neelakantam et al., "A Real System Evaluation of Hardware Atomicity for Software Speculation", Proceedings of the fifteenth edition of ASPLOS on Architectural support for programming languages and operating systems, vol. 38, Issue 1, Mar. 13-14, 2010, pp. 29-38.
Parisha et al., "Improving Branch Prediction Accuracy in Embedded Processors in the Presence of Context Switches", IEEE Computer Society, Proceedings of the 21st International Conference on Computer Design, Oct. 27, 2003, 6 pages.

(56) References Cited

OTHER PUBLICATIONS

Patel et al., "rePLay: A Hardware Framework for Dynamic Optimization", IEEE Transactions on Computers, vol. 50, Issue 6, Jun. 2001, pp. 590-608.
Rosner et al., "PARROT: Power Awareness Through Selective Dynamically Optimized Traces", PACS 2003, pp. 196-214.
Shrout, "NVIDIA GeForce 200M GPU Update—Power numbers and efficiency", PC Perspective, Jun. 18, 2009, 4 pages, available at: <http://www.pcper.com/comments.php?nid=7364>.
Smith et al., "Achieving High Performance via Co-Designed Virtual Machines", Innovative Architecture for Future Generation High-Performance Pro-cessors and Systems, Oct. 26-28, 1998, pp. 77-84.
Sturdevant, "Nehalem chips in." eWEEK Apr. 6, 2009, available at: <http://eweekdigital.eweek.com/publication/?i=14803>.
Suleman et al., "Accelerating Critical Section Execution with Asymmetric Multicore Architectures", IEEE Computer Society, vol. 30, Issue 1, Jan.-Feb. 2010, pp. 60-70.
Suleman et al., "Accelerating Critical Section Execution with Asymmetric Multi-Core Architectures", Proceeding of the 14th international conference on Architectural support for programming languages and operating systems, vol. 44, Issue 3, Mar. 7-11, 2009, pp. 253-264.
Suleman et al., "Data Marshaling for Multi-core Architectures", Proceedings of the 37th annual international symposium on Computer architecture, vol. 38, Issue 3, Jun. 19-23, 2010, pp. 441-450.
Wang et al., "Dynamic Parallelization of Single-Threaded Binary Programs using Speculative Slicing", Proceedings of the 23rd international conference on Supercomputing, Jun. 8-12, 2009, pp. 158-168.
Wu et al., "The Accuracy of Initial Prediction in Two-Phase Dynamic Binary Translators", IEEE Computer Society, Proceedings of the International Symposium on Code Generation and Optimization, 2004, 12 pages.
European Search Report for Application No. 16167193.8-1959, dated Aug. 18, 2016, 10 pages.
Kumar, Rakesh, et al., "Single-ISA Heterogeneous Multi-Core Architectures: The Potential for Processor Power Reduction," IEEE Computer Society, Proceedings of the 36th International Symposium of Microarchitecture, 12 pages.
European Search Report for Application No. 16167185.4-1959, dated Aug. 25, 2016, 9 pages.
European Search Report for Application No. 16167191.2-1959, dated Aug. 25, 2016, 10 pages.
Notice of Reasons for Rejection and English Translation for Japanese Patent Application No. 2015-101264, dated Jul. 12, 2016, 3 pages.
Official Letter and Search Report for Korean Patent Application No. 100149541, dated Aug. 20, 2015, 3 pages.

* cited by examiner

DYNAMIC CORE SELECTION FOR HETEROGENEOUS MULTI-CORE SYSTEMS

FIELD

This invention relates to the field of processors and, in particular, to optimizing power and performance efficiency.

BACKGROUND

Advances in semiconductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors.

The ever increasing number of processing elements—cores, hardware threads, and logical processors—on integrated circuits enables more tasks to be accomplished in parallel. However, processors that employ all out-of-order cores may lead to power inefficiencies and/or performance inefficiencies under some circumstances. As a result, some hardware-software co-designed systems have been developed to confront the power-performance efficiency problem. In that system, a wide, simple in-order processor may be utilized, while software optimizes and schedules programs to run on the in-order hardware efficiently.

Yet, hardware-software co-designed systems are typically associated with two adverse impacts: (1) translation and/or optimization of code utilizing a binary translator may slow down some applications with short running tasks and small response-time constraints (a binary translation glass jaw); and (2) an in-order processor may not perform well for some styles of programs that are better suited for parallel execution (an in-order glass jaw).

BRIEF DESCRIPTION OF THE DRAWINGS

The present invention is illustrated by way of example and not intended to be limited by the figures of the accompanying drawings.

DETAILED DESCRIPTION

Figure 1:
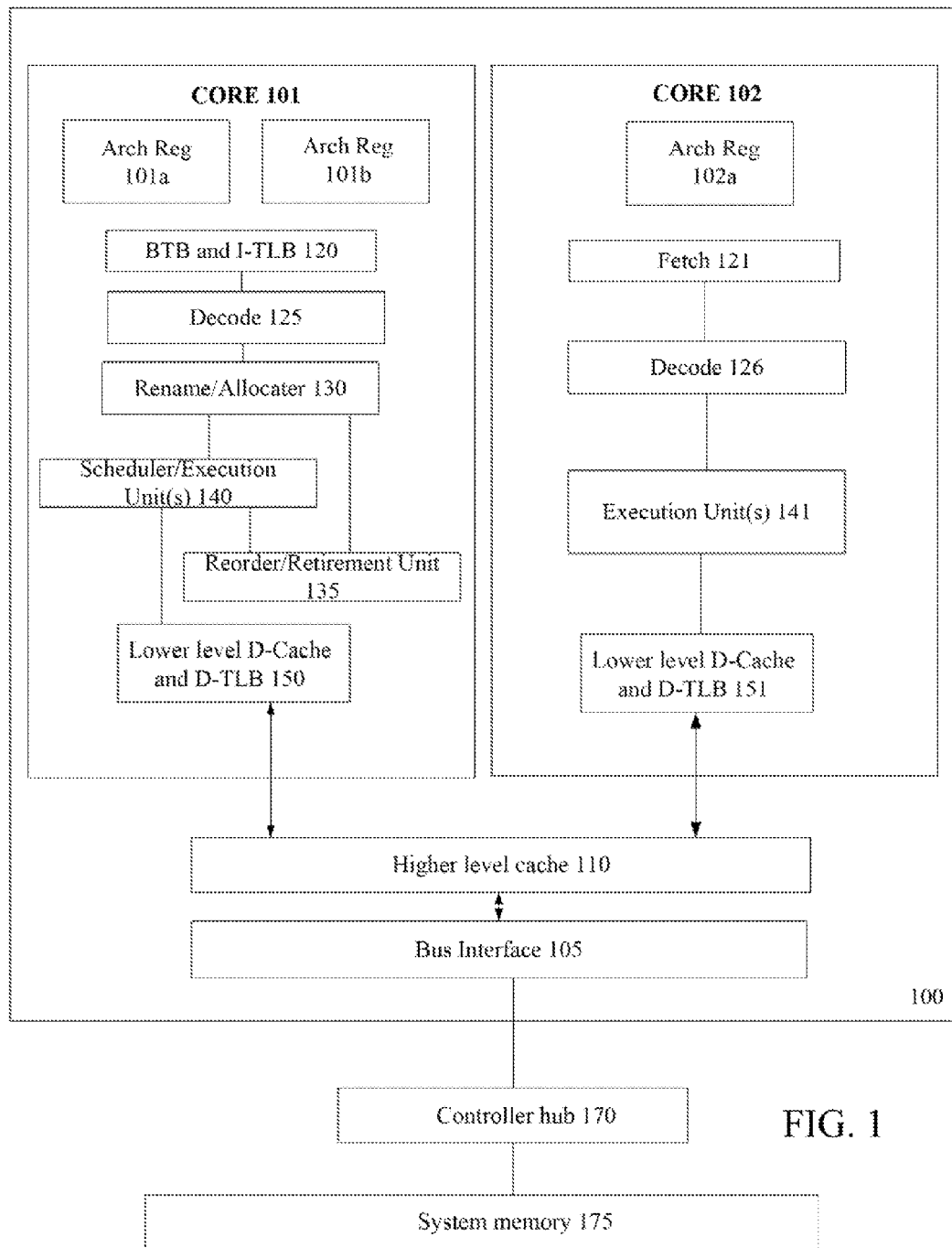
FIG. 1 illustrates an embodiment of a processor including two heterogeneous cores.

A heterogeneous computing strategy is to integrate a number of cores, wherein each core is efficient at executing certain code but inefficient at executing certain other code. The runtime software (SW) and hardware (HW) collaboratively partition the input program into code segments suitable for different cores, and execute each of them on the most appropriate core, while putting the other cores in low power state, to achieve high performance with low power and energy consumption. One example of such a system consists of at least one wide-in-order core and at least one narrow out-of-order core, and according to embodiments of the present invention, this heterogeneous system can achieve improved out-of-order core performance while consuming a fraction of energy and power. A major challenge for this type of computing system is to identify program behavior changes quickly and switch to the appropriate core efficiently at runtime. Embodiments of the present invention use runtime software and/or hardware to automatically switch execution of different code segments in the same program to the most appropriate core, and significantly speed up performance of single threaded programs.

In the following description, numerous specific details are set forth such as examples of specific types of processor cores, specific processor configurations, specific hot code region identification algorithms, specific structures for storing translated/optimized code, specific division of tasks between hardware/software, specific processor units/logic, etc. in order to provide a thorough understanding of the present invention. It will be apparent, however, to one skilled in the art that these specific details need not be employed to practice the present invention. In other instances, well known components or methods, such as specific and alternative processor architecture, specific logic circuits/code for described algorithms, specific code implementations, specific binary translation details, and other specific operational details of microprocessors haven't been described in detail in order to avoid unnecessarily obscuring the present invention.

In one embodiment, the method and apparatus described herein are for implementing a native core with a software-managed core to achieve maximum performance and power savings. Specifically, the collaboration between cores is discussed primarily in reference to an out-of-order core and an in-order, co-designed core. Yet, the apparatus' and methods described herein are not so limited, as they may be implemented in any distribution of code between heterogeneous cores. For example, the code distribution methods and apparatus' described herein may be utilized with two out-of-order cores that implement unique Instruction Set Architectures (ISAs). Furthermore, the collaboration between such cores is often discussed as split between hardware mechanisms and code/software. However, any blend or exclusive use of hardware, software, and/or firmware may be utilized to implement the methods and apparatus' described below.

Referring to FIG. 1, an embodiment of a processor including multiple cores is illustrated. Processor 100 includes any processor, such as a microprocessor, an embedded processor, a digital signal processor (DSP), a network processor, or other device to execute code. Processor 100, in one embodiment, includes at least two cores—core 101 and 102—of different types. However, processor 100 may include any number of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered heterogeneous cores, i.e. cores with different configurations, functional units, and/or logic. In one embodiment, core 101 includes an out-of-order processor core, while core 102 includes an in-order processor core. However, cores 101 and 102 may be individually selected from any type of core. Yet to further the discussion, the functional units illustrated in FIG. 1 are described in further detail below.

As depicted, core 101 includes two hardware threads 101a and 101b, which may also be referred to as hardware thread slots 101a and 101b. In contrast, core 102 includes one hardware thread 102a. Therefore, software entities, such as an operating system, in one embodiment potentially view processor 100 as three separate processors, i.e. three logical processors or processing elements capable of executing three software threads concurrently. Alternatively, a software entity may only view processor 100 as having two separate processors—thread slots 101a and 101b—while the described code distribution mechanisms manage execution of code on core 102.

A first thread is associated with architecture state registers 101a, a second thread is associated with architecture state registers 101b, and a third thread may be associated with architecture state registers 102a. As illustrated, architecture state registers 101a are replicated in architecture state registers 101b, so individual architecture states/contexts are capable of being stored for logical processor 101a and logical processor 101b. Architecture state registers 102a may be the same as registers 101a, 101b. Or registers 102a may instead be unique to the architecture of core 102. In core 101, other smaller resources, such as instruction pointers and renaming logic in rename allocator logic 130 may also be replicated for threads 101a and 101b. Some resources, such as re-order buffers in reorder/retirement unit 135, instruction-translation buffer (ITLB) 120, load/store buffers, and queues may be shared through partitioning. Other resources, such as general purpose internal registers, page-table base register, low-level data-cache and data-TLB 150, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 is illustrated as a simplified out-of-order (OOO) processor core. The OOO core includes a branch target buffer (BTB) 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first Instruction Set Architecture (ISA), which defines/specifies instructions executable on processor 100. Here, often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction status. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data address translation lookup/side buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As stated above, in one embodiment, core 102 includes an in-order, co-designed core. As a result, FIG. 1 illustrates a simplified pipeline of an in-order core. This pipeline includes fetch unit 121, decode unit 126, execution unit(s) 141, and a lower-level data cache 151. These units may work in a similar manner to the corresponding units in core 101. Yet, in an in-order core, the instructions/operations are executed in program order, instead of potential out-of-order execution as in core 101. In one example, out-of-order core 101 is referred to as the native core, while the in-order core 102 is referred to as a co-designed core. Alternatively, in-order core 102 is the native core and out-of-order core 101 is the co-designed core.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

In the depicted configuration, processor 100 also includes link interface module 105 to communicate with devices external to processor 100, such as system memory 175, a chipset, a northbridge, or other integrated circuit (including single integrated circuit implementations such as a "system on a chip" (SOC)). Memory 175 may be dedicated to processor 100 or shared with other devices in a system. Common examples of types of memory 175 include dynamic random access memory (DRAM), static RAM (SRAM), non-volatile memory (NV memory), and other known storage devices.

In one embodiment, code is distributed between core 101 and 102 based on maximizing performance and power. For example, code regions are identified to perform better on one of the two cores 101, 102. As a result, when one of such code regions is encountered/detected, that code section is distributed to the appropriate core. Identification of such regions may be done statically (before execution of the code, such as through program profile analysis) or dynamically (during execution of the code) by hardware, software, or a combination thereof.

In one illustrative example of a dynamic approach, one processor core, such as core 101, may be selected as a default core to execute code based on its performance, power-savings, native ISA, any other known processing consideration, or a combination thereof. Then, regions of the default code that execute poorly on core 101, or would execute better on core 102, are identified. Upon subsequently encountering those identified code sections, they are distributed to core 102 for execution. Note that execution of those regions on core 102 may include speculative, run-ahead execution to warm-up core 101, serial execution of those regions on core 102 with execution of other regions on core 101 that depend on results from those regions, or parallel, concurrent execution of those regions with execution of other code on core 102.

In an example of a static approach, a compiler or user may identify sections of code, such as with instructions or demarcations, which execute better on one core or the other. Here, core 101 executes code until such an instruction is encountered. Either in response to monitoring from core 102 or by sole initiative (triggering) of core 102, the identified code section is then executed on core 102 based on the encountered instruction.

Whether identification of code sections to run better on one core or another is done dynamically or statically, in some embodiments, native code is translated and/or optimized to be run on another core. For example, assume core 101 includes decode logic 125 that recognizes a first ISA type, and core 102 includes decode logic 126 that recognizes a second ISA type. In this case, if a code region of the first ISA type is to be executed on core 102, then the code region is translated to the second ISA type to be executed on core 102. Note that translation between ISA types is purely illustrative. Instead, out-of-order optimized code to be executed on core 101 may be re-optimized for execution of in-order core 102. In this scenario, core 102 may include the same, or a subset of, the same ISA as core 101. Yet, optimizations are performed on the code to ensure it runs more efficiently on a simple, wide in-order core.

The collaboration between core 101 and core 102 to distribute code efficiently may be implemented in hardware, firmware, software, or a combination thereof. The example above regarding a dynamic approach to identifying code regions is further examined to illustrate exemplary embodiments of collaboration mechanisms. In the example, program code, in a native format, is optimized to execute on out-of-order core 101. During execution of a code region or the program code, monitor hardware associated with core 101 and/or core 102 may be utilized to determine the performance associated with core 101's execution of the code region. Alternatively, code, such as software, OS code, micro-code, or other code, may be executed on core 102, to determine/monitor the performance of core 101 in executing the code region. If it's determined that the code region would be better executed on core 102, then hardware, software, firmware, or a combination thereof may be utilized to translate and/or optimize the code region to be executed on core 102.

As a result, when core 101 encounters the code region again—an instruction pointer references the code region, an identifier instruction to identify the code region is fetched or decoded, or another way of identifying a code region is detected—then the translated/optimized version of the code region is executed on core 102. In one embodiment, during execution of the code region on core 102, core 101 may concurrently execute other code regions to increase overall program execution performance. Note that concurrent or parallel execution may include execution of separate software threads on cores 101, 102 as well.

In contrast, threads may be pipelined on cores 101, 102. As an example of this scenario, assume each of the two software threads includes multiple stages of code (hot, cold, etc). Here, cold code from a first thread may be executed on core 101, and when a hot region is encountered, a translated hot region is executed on core 102. During execution of the translated hot region of code on core 102, cold code from the second thread may be executed on core 101. On core 102, when execution of the first translated hot code completes, execution of another hot region from the second software thread may then be started. As can be seen from this example, the stages of code may be interleaved on each core resulting in a pipelined type of execution. In another embodiment, code may be executed sequentially with respect to the two cores, such as a code region on core 101, the identified code region on core 102, and then subsequently another code region on core 101.

In addition, even when a code region is initially identified for execution on core 102, the performance of that execution may also be monitored. The performance on both cores may then be taken into account in determining which core is best suited to execute the code region to achieve maximum performance and power savings. For example, if a code region is identified to be executed as translated code on core 102, but the performance on core 102 is below the performance on core 101 (or the performance gain on core 102 doesn't outweigh the power savings of execution on core 201), then the code may be re-distributed to core 101 upon subsequent encounters.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. Furthermore, a majority of the discussion above has been in reference to an out-of-order processor core and an in-order processor core. However, as aforementioned, the two processor cores may be any version of heterogeneous cores, such as a native core and a software managed core. In addition, FIG. 1 only depicts two cores; yet, a processor may include any number of cores, such as multiple cores of the same type, as well as more than two cores that each differ in type.

FIG. 1 also illustrates an embodiment of processor that is coupled in a point-to-point fashion with an interface to an external memory controller (controller hub 170). However, many current processors have begun including an on-processor memory interface module—an on-chip module—with a ring configuration to interconnect multiple cores, as well as shared caches and other interfaces. Although not illustrated, processor 100, in one embodiment, includes a ring interconnect coupling core, cache, and memory controller components.

Here, caching agents are utilized to manage a slice of a physically distributed cache. As an example, each cache component is to manage a slice of a cache for a collocated core—a core the cache agent is associated with for purpose of managing the distributed slice of the cache. Much like cache agents handle traffic on a ring interconnect and interface with cache slices, core agents/components are to handle traffic and interface with cores. Additionally, the ring interconnect may couple Memory Controller Interface Logic (MCIL) and/or other controllers to interface with other modules, such memory and/or a graphics processor.

Figure 2:
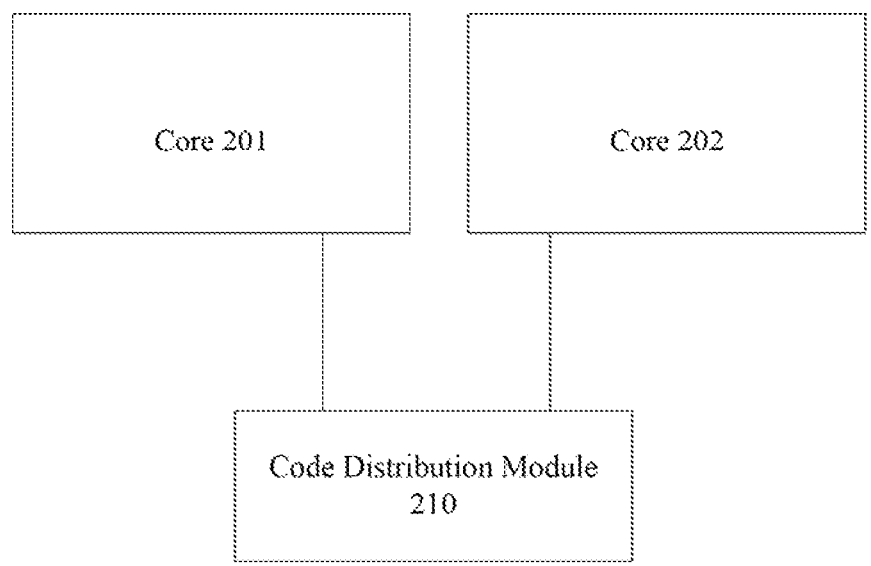
FIG. 2 illustrates an embodiment of a processor including a native core, a software-managed core, and a code distribution module

Referring to FIG. 2 an embodiment of a code distribution module to distribute code among two cores is illustrated. In one embodiment, cores 201, 202 are heterogeneous cores. For example, core 201 is an out-of-order (OOO) core adapted to execute code out of original program order, and core 202 is an in-order (or serial core) adapted to execute code in program order. A non-exhaustive exemplary list of other core types include: a native core, a non-native core, a software managed core, a native ISA core, a translated ISA core, a co-designed core, a speculative execution core, and a non-speculative execution core.

In one embodiment, code distribution module 210 is to distribute code between core 201 and 202 based on maximizing performance and power savings. A module as used herein may refer to hardware, software, firmware, or a combination thereof. Additionally, a module, unit, or logic may be centralized in a core or processor, as well as distributed throughout. For example, code distribution module 210 may include distribution code, such as micro-code or software, held in storage associated with core 201, core 202, processor 200, or a system including processor 200. Here, the distribution code, when executed, is to perform the code distribution. In contrast, the code distribution process may be managed by hardware, software, firmware, or a combination thereof.

In one embodiment, code distribution module 210 is to dynamically switch execution of program code from one core to another. Dynamically switching program code is discussed in more detail below in reference to FIG. 4 and FIG. 5. However, as an illustrative example for this section of discussion, program code may include any code to be executed with a processing element, such as binary or machine code. A hot portion of code may refer to a portion of code that is better suited to execute on one core over the other based on considerations, such as power, performance, heat, other known processor metric(s), or a combination thereof. Here, assuming core 201 is a default core for native execution of the program code, then identification of a hot portion of the program code includes determining a portion of code that is better suited to be executed on core 202. In the embodiment where core 201 is an OOO core and core 202 is an in-order core, then a hot portion of code may refer to a hot spot of the program code that is better suited to be executed on serial core 202, which potentially has more available resources for execution of a highly-recurrent section. As an example, a hot portion of code is identified by a recurrence pattern of the portion of code, or some other known metric, such as instruction count or cycle count. Often a section of code with a high-recurrence and predictable latency pattern may be optimized to be executed more efficiently on an in-order core. Essentially, in this example, cold code (low-recurrence) is distributed to native, OOO core 101, while hot code (high-recurrence) is distributed to software-managed, in-order core 102.

A hot portion of code may be identified statically, dynamically, or a combination thereof. In the first case, a compiler or user may determine a section of program code is hot code. Here, a hot code identifier instruction(s) may demarcate a section of code as hot, i.e. to be executed on core 202 instead of on core 101. Decode logic in core 201, in one embodiment, is adapted to decode a hot code identifier instruction from the program code, which is to identify the hot portion of the program code. The fetch or decode of such an instruction may trigger translation and/or execution of the hot section of code on core 202. In this example, the code distribution module 210 includes the decode logic to detect the hot code detection instruction. And module 210 may also include other hardware and/or software to carry out the translation/optimization, as well as the execution of the hot code on core 202. Alternatively, the hot-code section may be pre-optimized/translated for execution on core 202.

In another example, code distribution module 210 dynamically (during execution) identifies hot spots/regions in program code. In one embodiment, hardware included in core 201 and/or core 202 is utilized to profile execution of the program code on a core, such as core 201. Based on the characteristics of the profile—power and/or performance metrics associated with execution—a region of the program code may be identified as hot code. Similar to the operation of hardware, monitoring code may be executed on one core, such as core 202, to perform the monitoring/profiling of program code being executed on the other core, such as core 201. Note that such monitoring code may be code held in storage structures within the cores, within processor 200, or held in a system including processor 200. For example, the monitoring code may be microcode, or other code, held in storage structures of core 201, core 202, or processor 200. And, the monitoring code may be executed by traditional execution units, as well as other firmware or logic on processor 200.

As yet another example, a static identification of hot code is made as a hint. But dynamic profiling of the program code execution is able to ignore the static identification of a region of code as hot; this type of static identification is often referred to as a compiler or user hint that dynamic profiling may take into account in determining which core is appropriate for code distribution. Moreover, as is the nature of dynamic profiling, identification of a region of code as hot doesn't restrict that section of code to always being identified as hot. For example, assume program code is being executed on an out-of-order core 201. Monitor code executing on core 202 monitors the performance level of core 201's execution of a section of the program code. Based on the implementation, if the performance on core 201 is determined to be enough lower than it would perform on core 202 and/or a recurrence pattern of the code section on core 201 is high-enough to be predicted to hide core transition overhead; then the code section is identified as hot. After translation and/or optimization, a translated version of the code section is executed on core 202. Similar to the monitoring of execution on core 201, the execution of the translated version of code may be monitored on core 202, such as through execution of the performance monitoring code. If the performance is lower on core 202 than on core 201, then the identification of the code section as hot may be dynamically reversed (the section of hot code may be relabeled as cold code).

Once a section, spot, or region of codes is identified as hot, code distribution module 210, in one embodiment, optimizes and/or translates the hot section of code to obtain optimized/translated hot code. In one embodiment, translation and/or optimization code, such as binary translation code, is held in storage logic of core 202. As an example, the binary translation code may be part of micro-code held in core 202. The translation/optimization code, when executed, translates/optimizes the code section for execution on core 202. In one embodiment, core 201, 202 may recognize the same ISA, or a subset thereof, where translation/optimization is merely translating/optimizing code to execute more efficiently on core 202. In another embodiment, core 201, 202 recognize different ISAs, where translation includes translating the code region from one ISA recognizable by core 201 to another ISA recognizable by core 202. Although translation/optimization is discussed in reference to execution of translation/optimization code, any known mechanism for translating/optimizing code, even through exclusive hardware, may be utilized.

In one embodiment, upon encountering an identified section of hot code with core 201, the hot code (a translated version thereof) is executed on core 202. Any known trigger for determining when a hot code region is encountered may be utilized. A few high-level examples include: encountering/referencing an instruction address associated with the code region, fetching/decoding/scheduling/executing an instruction identifying a code section as hot code, fetching/decoding/scheduling/executing an instruction indicating a translated version of hot code is to be executed on another core, an external trigger from a monitor indicating a hot code region has been encountered, etc.

As an illustrative example, code distribution module 210 includes a monitor module implemented in hardware, software, or a combination thereof. When the monitor module identifies a hot region of code or translates the hot region to a translated region, the monitor module registers an instruction address associated with the hot region of code. This registration may include association of the instruction address with a location of the translated region of code. Then, when an instruction pointer (program counter) subsequently references the instruction address, it's determined from the registered instruction address that a hot region of code has been encountered. Note that any form of detection may be used here, such as a synchronous or asynchronous interrupt style of handling the encounter event. Additionally, hardware, micro-code, and/or firmware may be capable of directly handling the encounter of a hot code section without interrupt-like handling, i.e. the trigger event is not serviced by a handler. Note that core 101 and 102 may share certain hardware structures, such as a mapping structure, to identify addresses that are registered as hot code.

In response to encountering a hot code section on core 201, a translated and/or optimized version of the hot code section is executed on core 202. Despite how the hot code section is identified and encountered on core 201, any known method for enabling execution of code on another core may be utilized. In one embodiment, a collaboration module is utilized to enable such execution. For example, cores 201, 202 may share certain hardware structures and/or include communication channels to share information. As one example, cores 101, 102 may share a data cache, so when execution is migrated from core 201 to 202, the data isn't physically moved, but rather is already resident in the shared cache. Similarly, a register file, such as a shadow register file, in one embodiment, is shared between cores 201 and 202, so register states (context) doesn't have to be migrated from one core to another. As an alternative, instead of sharing a register file, a high-speed interconnect may be used to physically migrate context, or a portion thereof, from one core to another. Additionally, with infrequent transfers software may be utilized to perform such transfers.

As one example, input values into a hot code-section are transferred from core 201 to core 202 to support execution of the hot-code section on core 202. After execution, output values are then transferred back to core 201. In one embodiment, only identified input/output values from code sections are transferred, i.e. a partial context switch. Note that such input values may be identified by the user (software/compiler) and/or by hardware/firmware algorithms. Here, direct access hardware may be adapted to read input values from registers, buffers, or other structures in core 201 and write them to core 202. Inversely, the same or different hardware may be utilized to read values from core 202 and write them to core 201. However, where identifying such values becomes too cumbersome, an entire context switch, replication, or sharing may be performed to provide values between cores 201 and 202.

Figure 3:
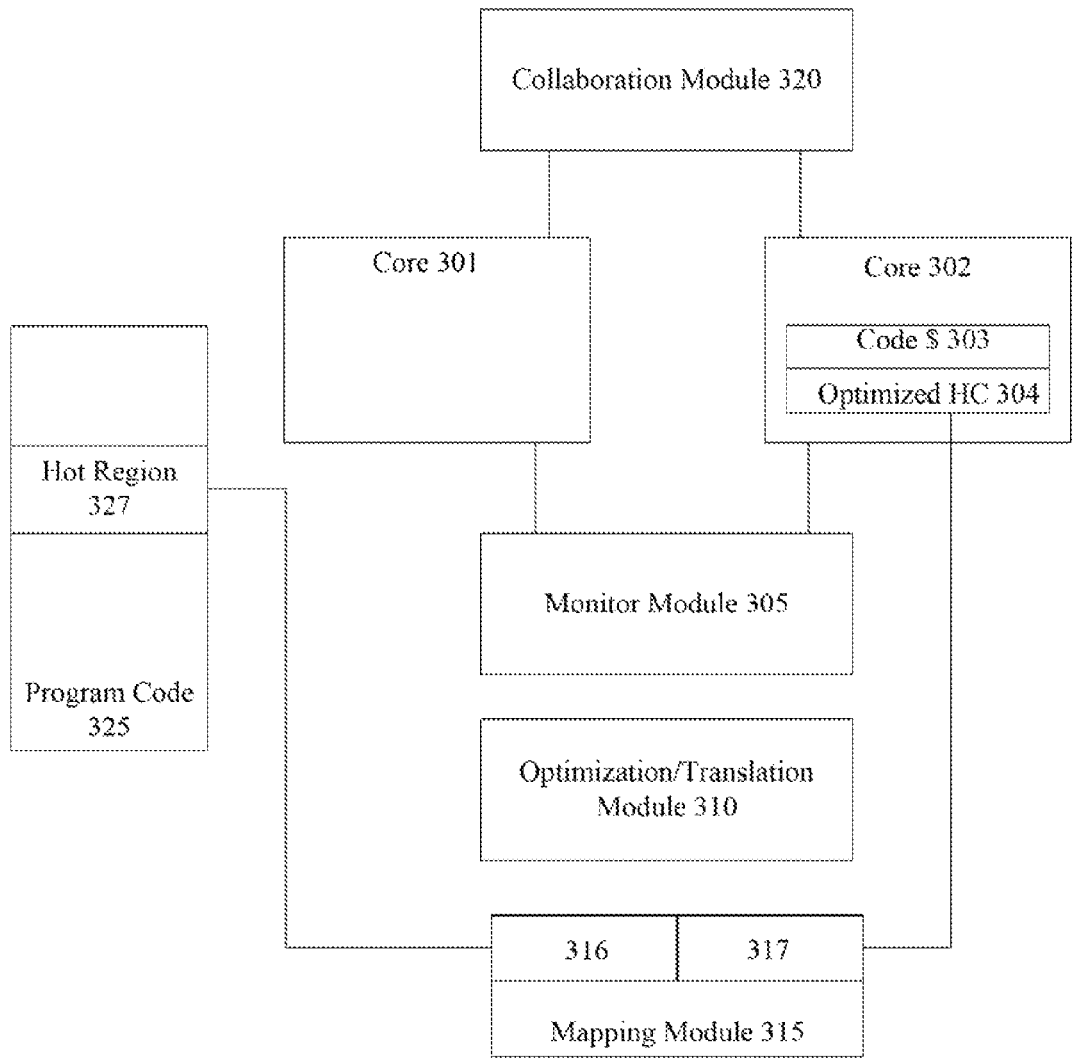
FIG. 3 illustrates an embodiment of a processor for distributing code among cores to achieve maximum performance and maximum power savings.

Referring next to FIG. 3, an embodiment of a processor for distributing code among cores to achieve maximum performance and power savings is depicted. As above, processor 300 includes two processor cores; each of which is of a different core type. As one example, core 301 is a native, out-of-order (OOO) processor core, while core 302 is a software managed, in-order processor core. Core 301 and 302 may, but are not required to, recognize different ISA types. In fact, core 302 may recognize a subset of core 301's ISA. Or, core 302 may include a separate ISA that partially overlaps core 301's ISA. As described above, a core or processor is often associated with an ISA—a definition of recognized instruction—by decode hardware/software in the core or processor.

In one embodiment, monitor module 305 is to monitor execution of native program code 325 on native, OOO core 301; through this monitoring, module 305 is to identify a hot portion/region 327 of the program code 325. Monitor module may be comprised of hardware, software, or a combination thereof. In one embodiment, monitor module 305 includes hardware to monitor execution. As one example, the hardware includes micro-architectural and/or architectural hooks, such as retirement pushout tags/counters to measure retirement pushouts, instruction counters to count numbers of instructions, overall trace execution measurement logic to measure overall execution length and/or time, recurrence counters to count a number of times a code section was executed, etc., to determine performance/power metrics during execution of code 325. This type of hardware may be located in any portion of an integrated circuit/processor, such as within out-of-order core 301, within in-order core 302, and in a non-associated portion of the integrated circuit that is not included within either OOO processor core 301 or the in-order processor core 302.

In another embodiment, monitor module 305 includes software, such as monitor code, which when executed, is to monitor execution of program code 325 and to identify a hot region 327 of the program code 325. As an illustrative example, processor 300 includes storage structures, such as Read Only Memory (ROM) structures, programmable logic, etc, to hold code, microcode, or machine code, when executed, causes the monitoring to occur. However, monitor code may be stored in any machine readable medium associated with cores 301, 302. Note that use of the term execution is not only limited to execution by traditional execution units, but instead may refer to execution by other hardware or programmable logic associated with processor 300, such as execution of microcode with firmware. Here, the executed monitor code may perform the same monitoring of recurrence, power, and performance metric that is measureable by hardware.

As one example, the monitoring hardware and/or code tracks/determines recurrence patterns for code sections of the program code. As a simple example, a data structure associates a reference to a code section (code region 327), such as an instruction address, with a count of the number of times the instruction address/code section has been executed on core 301. Note that the count may be associated with an absolute count (total count) or a temporal count (a count over an amount of time).

In one embodiment, monitor module 305 is adapted to identify/detect a hot portion 327 of program code 325. Monitor module 305, in one example, is to measure one or more performance metric(s) for the hot portion 327 of the program code 325 during execution on OOO processor core 301. And module 305 is to identify the hot portion 327 of program code 325 in response to the performance metric(s) on the OOO processor core being below a threshold. A non-exhaustive, illustrative list of examples of performance metrics include: instruction retirement pushout, a number of instructions executed, an amount of time to execute a code region, a number of times a code regions is encountered/executed, an amount of power consumed during execution of a code region, an amount of time spent in different power states during execution of a code region, a thermal density during execution of a code segment, etc.

Using one of the examples above, assume OOO core 301 is executing program code 325. Monitor code is being executed to determine a number of times regions of program code 325 are executed on core 301. When that count meets or exceeds a threshold, in one embodiment, monitor module 305 identifies/determines that region 327 is hot code. If a threshold value of three is used, then when monitor code executing on core 302 detects hot region 327 being re-executed a third time on core 301, region 327 is identified as a hot region of code. The specific example of determining a recurrence pattern may be extrapolated to see that a similar process—count, compare against a threshold, and identify—may be employed for any measured performance metric. Furthermore, determining a performance metric is not limited to simple counts, but may include any known algorithm for determining execution or power savings performance in a core, processor, or computer system.

However, identifying hot region 327 within program code 325 is not limited to dynamic performance monitoring. Instead, compiler or static program analysis may be utilized to determine code sections that are likely to be better suited for execution on in-order core 302. For example, assume program analysis reveals that hot region 327 is likely to be re-executed a number of times. In response to this discovery, a compiler or user may insert instructions or demarcations identifying a section of code as hot code. Therefore, when decoders of core 301 encounter such instructions, they recognize that region 327 is hot code that is to be executed on core 302. Note that in some embodiments, users may identify such regions of code based on their knowledge of a program without in-depth program analysis.

In one embodiment, in response to identifying region 327 as hot, code 327 is optimized or translated by optimization/translation module 310 to obtain optimized hot code 304. Similar to operation of monitor module 305, optimization module 310 may be implemented in hardware, software, firmware, or a combination thereof. For example, translation and/or optimization code may be stored in structures associated with core 302, core 301, or processor 300. To illustrate, binary translation code is stored in firmware associated with core 302. And the binary translation code is executed to translate hot region 327 from a native format for core 301 to a format for core 302. Note that translation may be between ISAs or other formats, while optimization may include any known method for optimizing code for execution, such as known techniques for optimizing code from parallel execution on OOO core 301 to serial execution on core 302, as well as the inverse.

However, use of binary translation code in firmware is purely illustrative, as any translation code or optimization code may be held anywhere in a computer system, such as microcode in core 302 or regular program code in a system memory. And, the optimization code may be executed in any manner to translate or optimize hot region 327 to obtain optimized hot code 304. In fact, any known methods or apparatus' for translating or optimizing code for a core, such as the methods and apparatus' known for translating code in current software managed processors may be used.

Whether software, firmware, hardware, or a combination is to be used, translation may be performed statically or dynamically. In fact, much like monitoring may be done dynamically during runtime or statically before execution, translation and optimization may similarly be performed. In the example where a compiler or user identifies hot region 327, the optimization and translation may take place at that point (before execution). Here, a hot code identifier instruction may be utilized to both identify hot code region 327 and specify the location of the optimized/translated code 304. However, no matter if section 327 is identified as hot code before or during execution, the optimization and translation, in some embodiments, takes place dynamically (during runtime).

In one embodiment, hot region 327 is optimized/translated in parallel with other execution. In one example, core 302 begins executing optimization code in parallel with core 301's execution of region 327. Here, monitor module 305 detects execution of hot code region 327 on core 301, so optimization is initiated on core 302. While further instructions from hot region 327 are still being executed on core 301, core 302 begins optimization. As a result, core 302 is essentially optimizing hot code 327 in parallel with execution of hot code 327 on core 301. In another example, core 301 executes other sections of program code 325 or other mutually exclusive code in parallel to core 302's optimization of hot code 327. In another embodiment, optimization of hot region 327 is done serially. For example, core 301 executes hot region 327, and then subsequently core 301 or 302 optimizes hot code region 327.

In one embodiment, code 327 is stored at its original memory location and translated on the fly by core 302. However, in most cases, it's more efficient to translate/ optimize an entire code section before execution. As a result, after optimization/translation module 310 optimizes code for a core, such as core 302, the optimized hot code 304 is stored elsewhere. The other location for optimized hot code 304 may be another location in memory, such as a home, system memory location. Yet, since hot code 327 is often associated with frequent execution, it's potentially advantageous to hold optimized version 304 closer to core 302. Therefore, in the illustrated embodiment, core 303 includes a code cache 303 to hold the optimized hot code 304. Note that code cache 303 may be a separate cache structure in core 302; a shared cache structure, such as a shared instruction or data cache in core 302; or other general storage structure associated with core 302.

Referring back to the discussion of monitor module 305, one embodiment of encountering hot code region 327 includes a program counter referencing an instruction address associated with a code section. As depicted, mapping module 315 is to hold a code region reference, such as the instruction address, associated with optimized hot code reference 317. Essentially, an entry of mapping module 315 associates hot code region 327 with an optimized version thereof (optimized hot code 304). As an illustrative example, reference 316 includes an address, such as the instruction address, associated with hot region 327. In this scenario, when core 301 encounters (a program counter points to) the instruction address held in field 316 of mapping module 315, then monitor module 305 indicates that hot region 327 has been encountered and is to be executed on core 302. Collaboration module 320, which is briefly described above and discussed in more detail below, then facilitates the movement of data and/or context to core 302 for execution.

Determining hot region 327 has been encountered and is to be executed on core 302, in the above example, is only on reference 316. The association of field 317 with field 316 may then be utilized to quickly determine where optimized hot code version 304 of region 327 is located. As a result, field 317 may include any reference to the location of optimized hot code 304. A few simple examples of such a reference include: an address of an entry in code cache 303 holding optimized code 304, an offset from the start of code cache 303 to entry 304 holding optimized hot code, and a physical or linear address associated with entry 304. Mapping module 315 is illustrated in a simple table structure, which may be implemented and/or maintained in hardware, software, firmware, or a combination thereof. Yet, any known method for associating one location with another location may be utilized for associating hot code 327 with an optimized version thereof.

Although not specifically illustrated, portions of monitor module 305 in combination with mapping module 315 may form a trigger module for indicating optimized hot code 304 is to be executed on core 302, instead of native code 327 on core 301. As an example, when a program counter for core 301 is moved to a next instruction address, trigger hardware checks that address against references stored in mapping hardware table 315. Here, assume the program counter points the instruction address that references code region 327 held in field 316. Then, the trigger hardware, based on the entry in mapping table 315, indicates that an optimized code region 304 for code region 327 exists. As a result, execution of code region 327 on core 301 may be elided, since an optimized version already exists and is to be executed on core 302.

In one embodiment, core 301 halts execution (stops or transitions into a low power state) until core 302 completes execution of the optimized code. However, this may not take full advantage of the processing capacity of processor 300. Therefore, in another embodiment, core 301 interleaves execution of another software thread (code other than program code 325), while optimized hot code 304 is executing on core 302. As yet another example, core 301 may execute other portions of program code 325 speculatively, which essentially performs a run-ahead helper thread of execution, or executes other portions of code 325 that don't depend from code region 327 out-of-order.

Collaboration module 320, in one embodiment, provides collaboration functionality between cores 301, 302. As the simplest example, collaboration module 320 includes an interconnect between cores 301, 302 to transfer information. Yet, in another embodiment collaboration module includes other hardware, which may be exclusive to individual cores or shared between, to facilitate the aforementioned collaboration. For example, core 302 may share a shadow register file of core 301, such that a full context switch of register state from core 301 to core 302 does not have to be performed when optimized hot code 304 is executed on core 302. Instead, core 302 is able to directly access the shadow register file in that scenario. However, collaboration module is not only limited to shared structures and/or an interconnect. In fact, collaboration module 320 may include hardware, firmware, software, or a combination thereof to provide direct read and/or write access to registers, storage structures, and buffers in both cores 301, 302. As a result, collaboration module 320, in one embodiment, is capable of transferring data/register values needed for execution of optimized hot code from core 301 to core 302. And, it is also capable of transferring results back from core 302 to core 301 to enable subsequent proper execution on core 301.

Although monitor module 305 has primarily been discussed in reference to monitoring execution on native core 301, monitor module 305, in one embodiment, is also to monitor execution of optimized code on core 302. As a result, monitor module 305 is capable of comparing performance of code section 327 on core 301 with performance of an optimized version 304 on core 302. Furthermore, when performance on core 302 is lower than performance on core 301, or the performance gain is small on core 302 in comparison to an increase in power consumption, then the decision to identify region 327 as hot code may be reversed. As an example, the entry of mapping module 315 indicating such a decision is de-allocated or invalidated; such that the next time core 301 encounters hot code 327, monitor module 305 does not detect reference 316 and does not indicate an optimized hot code version of region 327 should be executed on core 302. Essentially, the reversal sends the previously identified region 327 back to out-of-order core 301.

As a specific illustrative example to further demonstrate this performance comparison, assume code region 327 is identified as hot code based on a high-recurrence pattern and a high-instruction execution count. As a result, code 327 is optimized by binary translation code resident on core 302 to obtain optimized code 304. When optimized code 304 is stored in code cache 303, an entry in mapping table 315 is created to associate code region 327 with optimized version 304. When core 301 next encounters a reference that matches the reference in field 316, then execution of optimized code 304 is triggered on core 302, instead of executing code region 327 on core 301. Note that collaboration module through transfer, sharing, or context switching provides the proper values from core 301 to core 302. During core 302's execution of optimized hot code 304, the same performance metric—instruction execution count—is tracked by monitor module 305. If the instruction execution count is less than code region 327 was executed on core 301, then the status quo of region 327 being identified as hot code continues in the future. However, if the instruction execution count is longer on core 302 or a significant power increase is detected, then the identification of region 327 as hot code may be reversed, as described above.

In addition to providing communication between cores 301 and 302, collaboration module 320 may also include other features to manage multiple cores of different types. As a first example, a power manager implements a power algorithm to ensure both core 301 and 302 don't operation at maximum power at the same time. However, this example is purely illustrative. And other power algorithms may allow such maximum operation. As another power consideration, core 302 may reside in a power state below maximum (a low-power state) during monitoring of execution on core 301. For example, when core 301 is associated with mechanisms to perform its own monitoring, then core 302 doesn't need to be fully powered up until there is an optimized version of code to be executed. As a result, power is potentially saved by turning off core 302 until it's needed for execution. Inversely, core 301 may be powered down (put in a power state below maximum, such as an ACPI low power state or sleep state), while core 302 is executing optimized hot code.

Dynamically switching execution from core to core involves two challenges: 1) timely and accurately predict the most appropriate core for a given segment of code, and 2) efficiently migrate execution between cores.

In one embodiment, program execution on a first core may be identified by runtime software and/or hardware (e.g. based on analyzed ILP in the code region), and then performance metrics and/or statistics of the current core may be continuously collected by Monitor Module 305 to predict when the execution of program code should switch to a second core. This approach is highlighted in FIG. 4. Since this approach uses data from a single core to predict the other core's performance, in one embodiment the approach is called a "single-core-prediction" algorithm.

Figure 4:
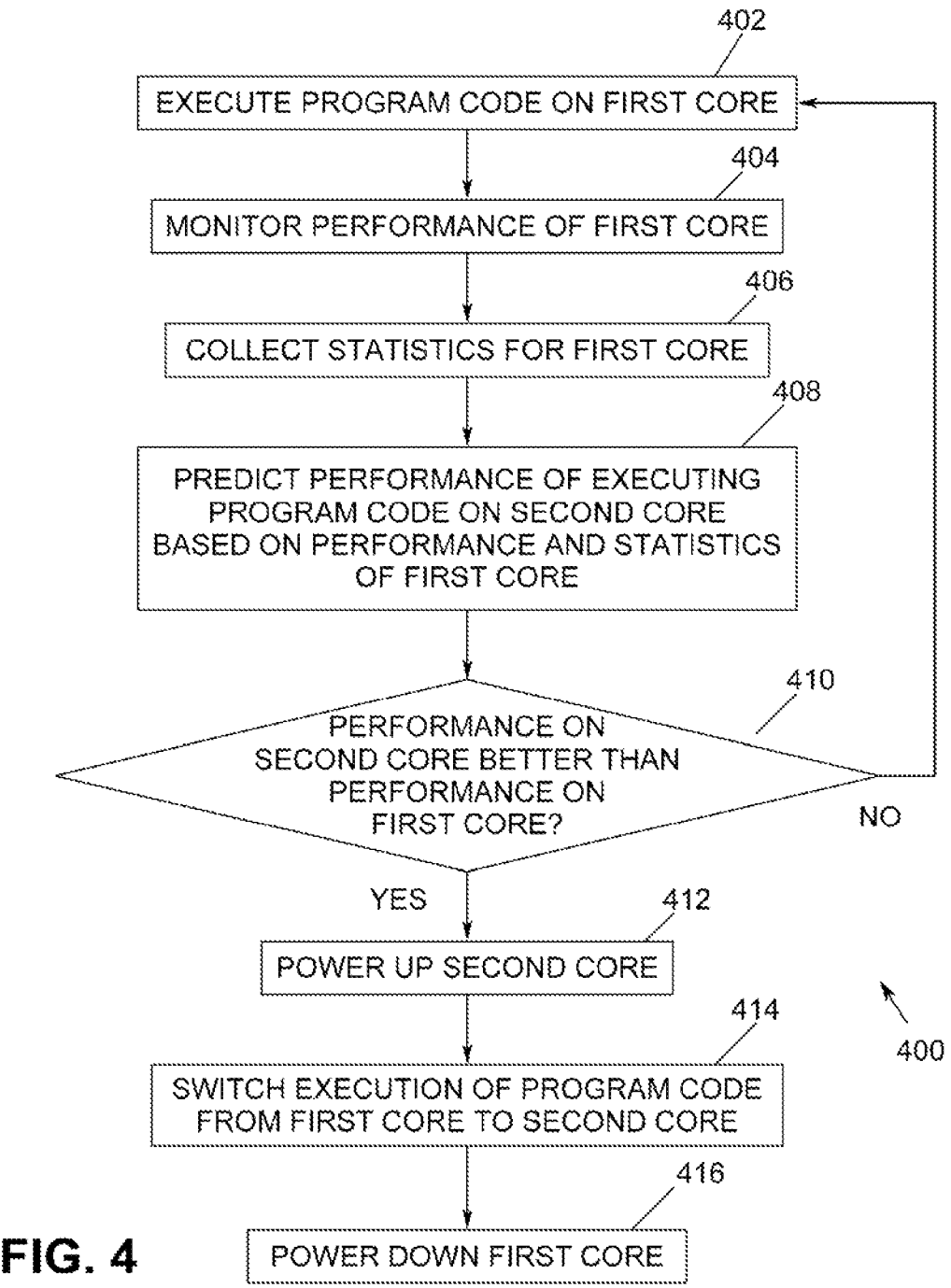
FIG. 4 illustrates an embodiment of a flow diagram for a method of distributing code among an out-of-order core and an in-order core to achieve maximum performance and power savings.

Turning to FIG. 4, an embodiment of a flow diagram for a method 400 of distributing code among a first core of a first type (such as an out-of-order core) and a second core of a second type (such as an in-order core) to achieve maximum performance and power savings is illustrated. Although the flows of FIG. 4 are illustrated in a substantially serial fashion, the flows may be performed in a different order, as well as in parallel. Furthermore, each of the flows may be performed utilizing hardware, firmware, or through execution of program code.

Execution of program code on an out-of-order (OOO) processor core in a processor is monitored. Reference to program code, in one embodiment, refers to (1) execution of a compiler program(s), either dynamically or statically, to compile other program code; (2) execution of a main program, such as an operating system, hypervisor, application code, or other software program; (3) execution of other program code, such as libraries, associated with the main program code, (4) execution of other program code, such as helper threads or other tasks, which may not be directly associated with main program; or (5) a combination thereof.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e., generally where syntactic processing, semantic processing, and some transformation/optimization may take place, and (2) a back-end, i.e., generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler.

In one embodiment, monitoring execution of program code by monitor module 305 comprises tracking a number of times code segments/regions within the program code are executed. Code regions may be determined in any known manner of grouping instructions/code. As an example, each time an instruction address associated with a code section is referenced by a program counter of the OOO core, a recurrence count is incremented. If the recurrence count for the code section exceeds a threshold, in one embodiment, the code section is identified as hot code.

Either in conjunction with determining recurrence patterns or separately, monitoring execution of program code may include determining/tracking a performance metric associated with code sections. As disclosed above, exemplary performance metrics may include: instruction retirement pushout, a number of instructions executed, an amount of time to execute a code region, a number of times a code regions is encountered/executed, an amount of power consumed during execution of a code region, an amount of time spent in different power states during execution of a code region, and a thermal density during execution of a code segment. Yet, any known metric, or combination of metrics, associated with processor execution may be monitored during execution of the program code.

At block 402, program code may be executed on a first core. In an embodiment, the first core may be of a first type, such as a narrow out-of-order core. At block 404, performance of the first core may be monitored as the first core executes the program code. At block 406, statistics on the performance may be collected. In an embodiment, the statistics may include branch miss rate, cache miss rate, etc. In an embodiment, monitoring performance and collecting statistics may be performed by Monitor Module 305. At block 408, the performance of executing the program code on a second core may be predicted based at least in part on the performance and statistics of executing the program code on the first core. In an embodiment, the second code may be of a second type, such as a wide in-order core. Alternatively, the first type may be a wide in-order core and the second type may be a narrow out-of-order core. In an embodiment, the prediction may be implemented as a function called "predict_performance." At block 410, if the predicted performance of the second core to execute the program code is better than the monitored performance of the first core executing the program code, then the following actions may be performed.

At block 412, the second core may be powered up from a low power or "sleep" state. During the power up, the first core continues execution of the program. At block 414, execution of the program code may be switched from the first core to the second core. At block 416, the first core may be powered down to a sleep state. If the predicted performance of the second core is not better than the first core, execution of the program code on the first core may continue. In a subsequent iteration of the method, positions of the first core and the second core in the method may be swapped (e.g., so that the second core is executed first, performance of the second core is monitored, statistics about the second core are collected, performance of the first core is predicted, and so on). In an embodiment, blocks 404 through 416 may be performed by Code Distribution Module 210.

The function predict_performance (core number, performance_core1, statistics_core1) uses the current core execution performance and statistics, performance_core1 and statistics_core1, to predict the performance of the execution on the second core. If the predicted performance is higher than that on the current core, the execution is switched to the other core. This approach is based on the assumption that it is possible to predict the other core's performance using the current core's performance information. Intuitively, a program execution with excessive cache/branch misses should perform better on the narrow out-of-order core due to its ability to hide the miss latency by executing the later instructions out-of-order. On the other hand, a program with high instruction level parallelism (ILP) and low cache/branch misses should run more efficiently on the wide-in-order core due to its high execution bandwidth.

In an embodiment, to define the function predict_performance, one may first run n pieces of code, c1, . . . , cn, on both the first core and the second core and collect their respective performance information (p11, p12, . . . , p1n), (p21, p22, . . . , p2n), and statistics (s11, s12, . . . , s1n), (s21, s22, . . . , s2n), on the two cores respectively. Then one may find the best fit function F such that (F(p11,s11), F(p12, s12), . . . , F(p1n,s1n))–(p21, p22, . . . , p2n) and (F(p21,s21), F(p22,s22), . . . , F(p2n,s2n))–(p11, p12, . . . , p1n) is minimized. If the standard error of the best fit is small, one may use F as the function predict_performance. If the standard error is high, however, one may need to find more performance parameters to enhance the prediction accuracy.

One advantage of this single-core-prediction approach is that it uses only the current core execution statistics to predict the performance of the other core, without the performance and power overhead of involving the other core in making the decision. However, this approach assumes that the performance of the two cores is closely correlated. In some environments/configurations, the performance of the two cores may be only loosely correlated and a good fit function may not exist. Therefore it may be desirable to have a more general approach.

In another embodiment, a dual-core-prediction process uses the performance information observed on two cores in a short period to predict the core switch. Specifically, a "prediction" may be performed at regular intervals to sample and compare the performance on the two cores to decide whether or not to switch the execution to a different core. Note that each prediction may involve two core switches: the first switch takes place to get the performance information from the other core, and the second switch may happen when the performance on the other core is not as good as that on the first core so the execution should switch back to the first core. The first core switch involves powering up the other core and warming up its micro-architectural state for execution, and the second switch only involves a core power-down.

To reduce core switch overhead, the prediction may be separated into two operations: a "prediction for continuation" (Pcont) operation and a "prediction for switch" (Pswit). The Pcont operation compares the performance information collected on the current core with the previous performance information of the two cores to decide whether or not the execution should continue on the current core. If the Pcont operation predicts that the execution should not continue on the current core, the Pswit operation activates the other core to run the other core for a short time period and compare the performance information on the two cores to decide whether or not the execution should be switched to the other core. To prevent Pcont from continuing execution on the same core for too long, the parameter K is introduced to dictate that the Pswit operation cannot be skipped for more than K times in a row. Also, each time a Pswit operation is skipped, the previous performance is inflated by an Inflation Factor so that the next Pcont period will find it harder to skip the Pswit operation.

Figure 5:
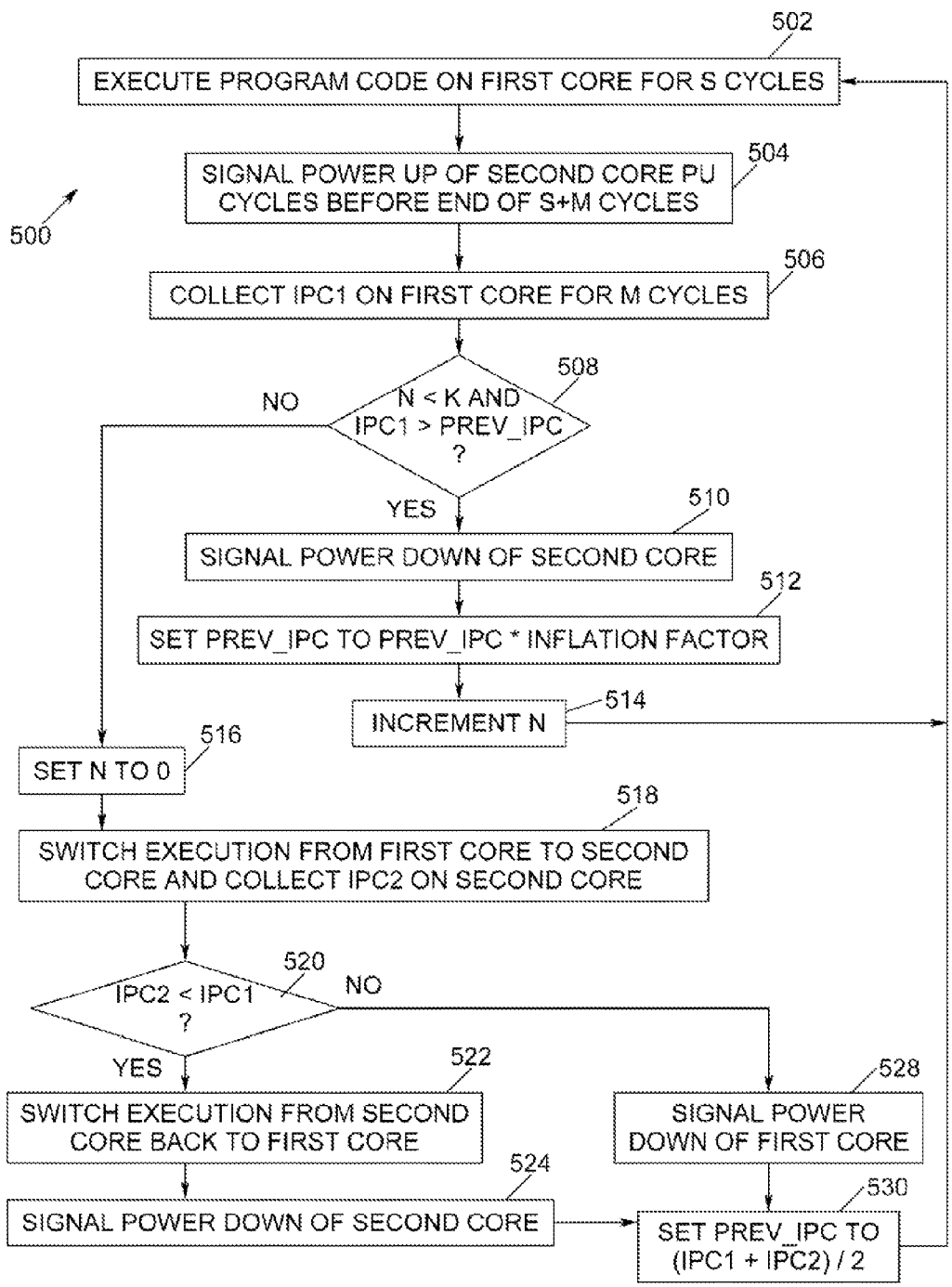
FIG. 5 illustrates another embodiment of a flow diagram for a method of distributing code among an out-of-order core and an in-order core to achieve maximum performance and power savings.

The dual-core prediction process 500 is shown in FIG. 5. In an embodiment, S is the sampling interval (e.g., number of cycles between predictions), M is the sample length (e.g., in number of cycles) to collect performance on each core, PU is a number of cycles for powering up the second core, IPC is the number of instructions per cycle, K is the maximum number of continuations (K being a natural number), N is the number of continuations (initially set to 0), and Prev_IPC is the previous IPC (which may be initially set to MAX_FLOAT). In an embodiment, S, M, PU, K, and the Inflation Factor may be set to appropriate values.

At block 502, program code may be executed on the first core for a sampling interval of S cycles. In an embodiment, the first core may be of a first type, such as a narrow out-of-order core. At block 504, power up of the second core may be signaled PU cycles before the end of S+M cycles from the start of program code execution. In an embodiment, the second core may be of a second type, such as a wide in-order core. Alternatively, the first type may be a wide in-order core and the second type may be a narrow out-of-order core. At block 506, the number of instructions per cycle for the first core (IPC1) may be collected for M cycles. In an embodiment, monitoring performance and collecting statistics may be performed by one of Monitor Module 305 or Code Distribution Module 210.

Next, prediction for continuing execution on the first core (Pcont) may be performed as follows. At block 508, if the number of continuations N is less than the maximum number of continuations K, and the number of instructions per cycle for the first core IPC1 is greater than a previous number of instructions per cycle (Prev_IPC, initially set to a maximum value), then blocks 510, 512, and 514 may be performed. In this case, a switch from the first core to the second core is not done. At block 510, power down of the second core may be signaled. At block 512, the previous number of instructions per cycle Prev_IPC may be set to Prev_IPC multiplied by the Inflation Factor. Processing continues with continued execution of the program code on the first core.

If the number of continuations N is less than or equal to the maximum number of continuations K, or the number of instructions per cycle for the first core IPC1 is less than or equal to than a previous number of instructions per cycle Prev_IPC at block 508, then blocks 516, 518, and 520 may be performed. In this case, a switch from the first core to the second core may be done. Next, prediction for switching execution (Pswit) from the first core to the second core may be performed as follows. At block 516, counter N may be set to 0. At block 518, execution of the program code may be switched from the first core to the second core and the number of instructions per cycle for the second core (IPC2) may be collected. Next, a check is made to verify that the switch was worthwhile.

At block 520, if the number of instructions per cycle on the second core (IPC2) is less than the number of instructions per cycle on the first core (IPC1), then execution of the program code may be switched from the second core back to the first core at block 522. Alternatively, if another performance metric is used other than number of instructions per cycle, then if performance on the second core is not better than performance on the first core, then execution of the program code may be switched from the second core back to the first core. Power down of the second core may then be signaled at block 524. However, if at block 520 the number of instructions per cycle on the second core (IPC2) is not less than the number of instructions per cycle on the first core (IPC1), then the switching of cores is worthwhile. Alternatively, if another performance metric is used other than number of instructions per cycle, then if performance on the second core is better than or equal to performance on the first core, then switching of cores is worthwhile. At block 528, power down of the first core may be signaled. In either case, processing continues in one embodiment at block 530 with a setting of the previous number of instructions per cycle (Prev_IPC) to the average of the IPC values (e.g., IPC1+IPC2/2). Although we use arithmetic mean as the average here, we can also use geometric mean, harmonic mean, and any other means to present the average of the two IPC values. Processing is now performed on the second core with the first core being powered down. In a subsequent iteration of the method, positions of the first core and the second core in the method may be swapped (e.g., so the second core is executed first for S cycle, signal power up of the first core, performance of the second core is monitored for M cycles, statistics about the second core are collected, and so on). In an embodiment, at least blocks 504 through 530 may be performed by Code Distribution Module 210.

Core switching involves several overheads: 1) activating the other core which may be in a low power state; 2) transferring x86 register states to the other core; 3) moving frequently accessed data into the other data cache; and 4) warming up instruction cache, branch predictor state, and other states on the other core.

The latency to wake up (or power up) the other core depends on the low power state in which the other core is in. In some embodiments, if the core is in the low power C2 state, which consumes ~30% of regular operating power, it may take ~5000 cycles to power the core up to normal operating speed (C0 state). If the core is in deeper power-down state (C6), which consumes<10% of operating power, it can take ~200K cycles to wake up in one embodiment. Although the power-up takes time, it can be done in parallel with the execution on the other core. For example, in an embodiment before the first core enters the Pswit/Pcont period, the first core (or other module) can send a signal to the second core to initiate power-up. At the end of the first core's prediction period, the second core may be already powered up and can continue execution of the program code. With this early power-up strategy, power-up latency should affect neither the core switch latency nor the performance, although it increases energy consumption.

Figure 6:
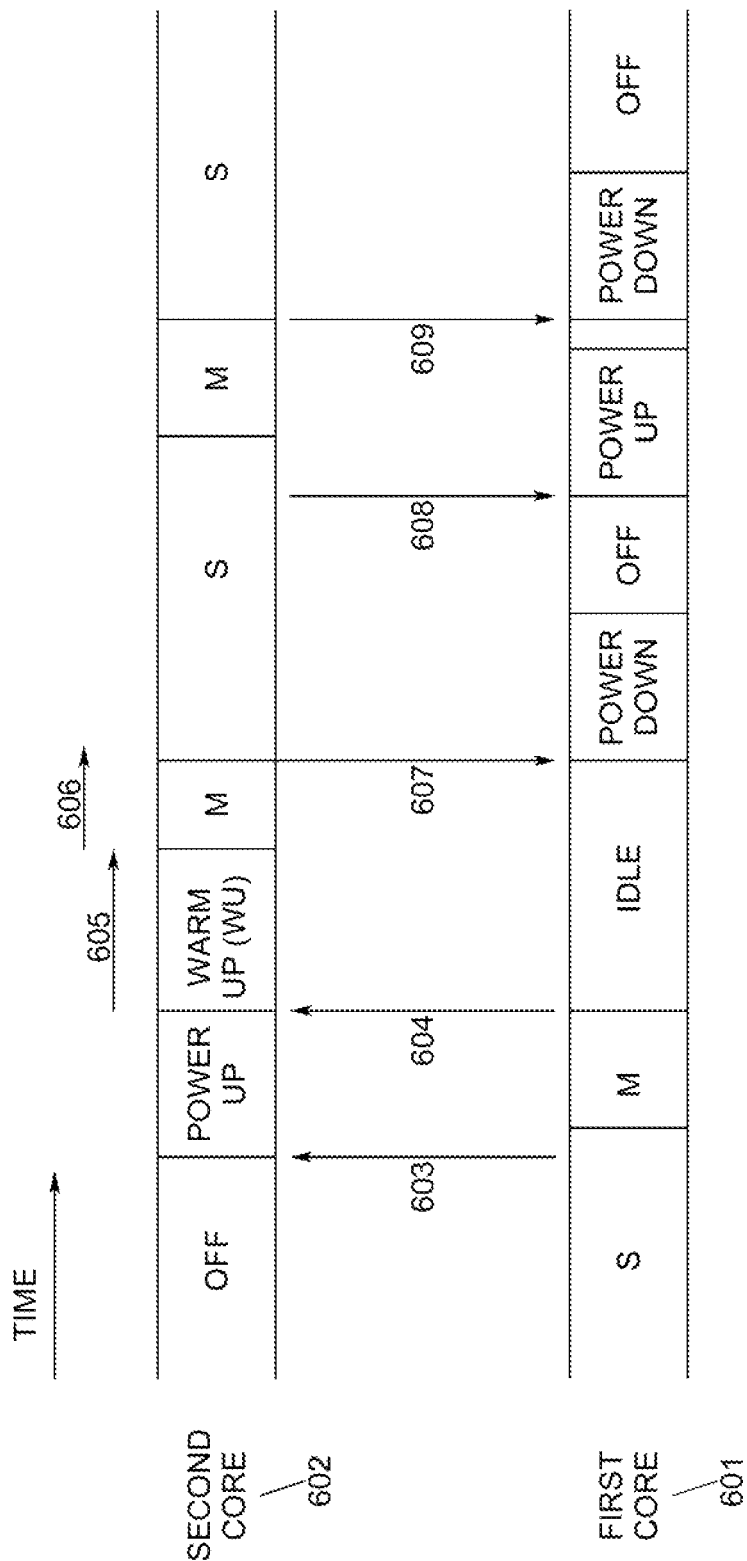
FIG. 6 illustrates core switch operations and overhead according to an embodiment of the present invention.

In an embodiment, data and instruction caches may take up to 10K cycles to warm-up, even if the level 2 (L2) cache is shared among the two cores. Also, modern hybrid branch predictors allow the branch predictor to be warmed up fairly quickly. Assume the core power up takes PU cycles and the branch predictor and L1 cache warm-up takes WU cycles. FIG. 6 illustrates the core switching action and overhead. The representations of time in FIG. 6 are merely illustrative and are not meant to convey any actual, specific timing relationships between the various stages. Before the first core 601 enters the Pcont period, the first core signals the second core 602 to power-up 603. After the first core finishes its Pcont operation and finds that a core switch may be needed, program code execution may be switched to the second core 604. At that time, the second core has already been powered up, and starts its warm-up for WU cycles 605. After the warm-up period, the second core runs for a short time (e.g., M cycles) to collect its performance data 606. Let's assume that at that time the second core's performance is better than the first core's performance, so the second core signals the first core to power down (PD) 607, and continues execution on the second core. Near the end of the next Pcont period, the second core signals to the first core to power-up 608. After the second core finishes its Pcont period and finds that the second core should continue execution, the second core signals the first core to power-down 609 and continues execution of the program code on the second core.

As a result of coupling a native core with a different co-designed core, the best of power and execution benefits are potentially obtained even within a single application when using dynamic core selection techniques as discussed herein. For example, with an out-of-order core and a software managed, in-order core, code that is not efficient on the software-managed core is migrated to the out-of-order core. And inversely, the code that is not efficient on the out-of-order core is migrated to the software managed core. Through hardware, software, firmware, or a combination therefore parallel execution of native code, hot code detecting, and hot code optimization may be efficiently managed, while individual sections of multiple threads may be efficiently interleaved in a pipelined fashion between the out-of-order and in-order co-designed cores. As a result, maximum performance may be obtained, while achieving better power performance through different power efficiency techniques, such as placing the out-of-order core in a low power state during execution on the in-order core in some implementations.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine readable medium which are executable by a processing element. A machine-readable medium includes any mechanism that provides (i.e., stores and/or transmits) information in a form readable by a machine, such as a computer or electronic system. For example, a machine-readable medium includes random-access memory (RAM), such as static RAM (SRAM) or dynamic RAM (DRAM); ROM; magnetic or optical storage medium; flash memory devices; electrical storage devices; optical storage devices; etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. One or more non-transitory computer-readable storage media comprising a plurality of instructions stored thereon that, in response to execution, cause a processing system to:
   execute program code on a first processor core of the processing system, wherein the first processor core is of a first type;
   monitor performance and collect statistics of the first processor core executing the program code;
   predict, while the program code is executed by the first processor core, performance of executing the program code on a second processor core of the processing system based at least in part on the monitored performance and collected statistics of the first processor core executing the program code, wherein the second processor core is of a second type, different than the first type; and
   switch execution of the program code from the first processor core to the second processor core in response to a determination that the predicted performance of executing the program code on the second processor core is better than the performance of the first processor core executing the program code.

2. The one or more non-transitory computer-readable storage media of claim 1, wherein the plurality of instructions further cause the processing system to power up the second processor core from a low power state in response to the determination that the predicted performance of executing the program code on the second processor core is better than the performance of the first processor core executing the program code.

3. The one or more non-transitory computer-readable storage media of claim 1, wherein the plurality of instructions further cause the processing system to power down the first processor core to a low power state in response to the determination that the predicted performance of executing the program code on the second processor core is better than the performance of the first processor core executing the program code.

4. The one or more non-transitory computer-readable storage media of claim 1, wherein the first processor core comprises an out-of-order processor core and the second processor core comprises an in-order processor core.

5. The one or more non-transitory computer-readable storage media of claim 1, wherein the second processor core comprises an out-of-order processor core and the first processor core comprises an in-order processor core.

6. The one or more non-transitory computer-readable storage media of claim 1, wherein to predict the performance of the second processor core comprises to:
   execute a plurality of code segments on both the first processor core and the second processor core,
   collect the respective performance information and statistics of the first and second processor cores while executing the code segments, and
   determine a best fit function F such that differences between F (performance information and statistics of the first core) and the performance of the second processing core are minimized.

7. The one or more non-transitory computer-readable storage media of claim 1, wherein to collect statistics of the first processor core executing the program code comprises to collect statistics indicative of a branch miss rate or a cache miss rate of the first processor core.

8. The one or more non-transitory computer-readable storage media of claim 7, wherein to switch execution of the program code from the first processor core to the second processor core comprises to switch execution of the program code from the first processor core to an out-of-order processor core in response to a determination that the branch miss rate or the cache miss rate is greater than a threshold rate.

9. The one or more non-transitory computer-readable storage media of claim 7, wherein to switch execution of the program code from the first processor core to the second processor core comprises to switch execution of the program code from the first processor core to an in-order processor core in response to a determination that the branch miss rate or the cache miss rate is less than a threshold rate.

10. One or more non-transitory computer-readable storage media comprising a plurality of instructions stored thereon that, in response to execution, cause a processing system to:
- execute program code on a first processor core of the processing system for a first number of cycles, wherein the first processor core is of a first type;
- signal power up of a second processor core of the processing system, wherein the second processor core is of a second type, different than the first type; and
- collect a first performance metric of the first processor core executing the program code for a second number of cycles, and
- in response to a determination that the first performance metric is better than a previously determined core performance metric, signal power down of the second processor core prior to execution of the program code on the second processing core after the second processing core has powered up and continue execution of the program code on the first processor core; or
- in response to a determination that the first performance metric is not better than the previously determined core performance metric, switch execution of the program code from the first processor core to the second processor core and collect a second performance metric of the second processor core executing the program code for the second number of cycles.

11. The one or more non-transitory computer-readable storage media of claim 10, wherein the plurality of instructions further cause the processing system, in response to a determination that the second performance metric is not better than the first performance metric, to switch execution of the program code from the second processor core back to the first processor core and signal power down of the second processor core.

12. The one or more non-transitory computer-readable storage media of claim 10, wherein the plurality of instructions further cause the processing system, in response to a determination that the second performance metric is better than the first performance metric, signal power down of the first processing core and set the previously determined core performance metric to an average of the first performance metric and the second performance metric.

13. The one or more non-transitory computer-readable storage media of claim 10, wherein to signal power up of the second processor core comprises to signal power up a third number of cycles before the end of the sum of the first number of cycles and the second number of cycles.

14. The one or more non-transitory computer-readable storage media of claim 10, wherein the plurality of instructions further cause the processing system to set the previously determined core performance metric to the previously determined core performance metric multiplied by an inflation factor in response to a determination that the first performance metric is better than the previously determined core performance metric.

15. The one or more non-transitory computer-readable storage media of claim 10, wherein the plurality of instructions further cause the processing system to force a switch of execution of the program code from the first processor core to the second processor core and collect a second performance metric of the second processor core executing the program code for the second number of cycles, at least once for every K comparisons of the first performance metric and the previously determined core performance metric, wherein K is a natural number.

16. The one or more non-transitory computer-readable storage media of claim 10, wherein the first processor core comprises an out-of-order processor core and the second processor core comprises an in-order processor core.

17. The one or more non-transitory computer-readable storage media of claim 10, wherein the second processor core comprises an out-of-order processor core and the first processor core comprises an in-order processor core.

18. The one or more non-transitory computer-readable storage media of claim 10, wherein the first performance metric is a branch miss rate or a cache miss rate of the first processor core during the second number of cycles.

19. The one or more non-transitory computer-readable storage media of claim 18, wherein to switch execution of the program code from the first processor core to the second processor core comprises to switch execution of the program code from the first processor core to an out-of-order processor core in response to a determination that the branch miss rate or the cache miss rate is greater than a threshold rate.

20. The one or more non-transitory computer-readable storage media of claim 18, wherein to switch execution of the program code from the first processor core to the second processor core comprises to switch execution of the program code from the first processor core to an in-order processor core in response to a determination that the branch miss rate or the cache miss rate is less than a threshold rate.

* * * * *